United States Patent [19]

Alba

[11] 3,827,448

[45] Aug. 6, 1974

[54] SUB-SEA PIPELINE TAPPING DEVICE

[76] Inventor: Richard O. Alba, 3804 Kent St., Metairie, La.

[22] Filed: Jan. 3, 1972

[21] Appl. No.: 214,821

[52] U.S. Cl. .................................. 137/15, 137/318
[51] Int. Cl. ...................... B23b 41/08, F16e 41/04
[58] Field of Search ...... 138/97; 137/315, 317, 318, 137/15; 285/197, 198, 199

[56] References Cited
UNITED STATES PATENTS

| | | | |
|---|---|---|---|
| 419,974 | 1/1890 | Smith | 137/318 |
| 3,315,989 | 4/1967 | Ohnstad | 137/318 X |
| 3,348,433 | 10/1967 | Mayes | 137/318 X |
| 3,374,521 | 3/1968 | Clarke | 137/318 X |
| 3,532,113 | 10/1970 | McKean | 137/318 X |
| 3,699,996 | 10/1972 | Nichols | 137/318 |

Primary Examiner—Henry T. Klinksiek
Assistant Examiner—David R. Matthews
Attorney, Agent, or Firm—Pugh & Laiche

[57] ABSTRACT

The present invention provides a device for tapping a pipeline submerged in water and while in service. The present device comprises pipe saddle means adapted to fit around and clamp over a given submerged pipeline to be tapped. The pipe saddle is adapted for injection of an epoxy resin therein to form a fluid tight seal between the pipe and the saddle. The saddle is also provided with a side outlet to which full flow through valve means is operably connected. Pipe tapping or drilling means are in turn provided for connection to the valve means whereby when said valve means is in a fully open position, the drilling head of the drilling means can be inserted through the valve and side outlet of the pipe saddle into contact with the pipe to be tapped. The tapping means further comprises a packing assembly for sealing off the tapping sub-assembly upon drilling through the pipe, as well as means for controlling the exact depth of drilling.

2 Claims, 6 Drawing Figures

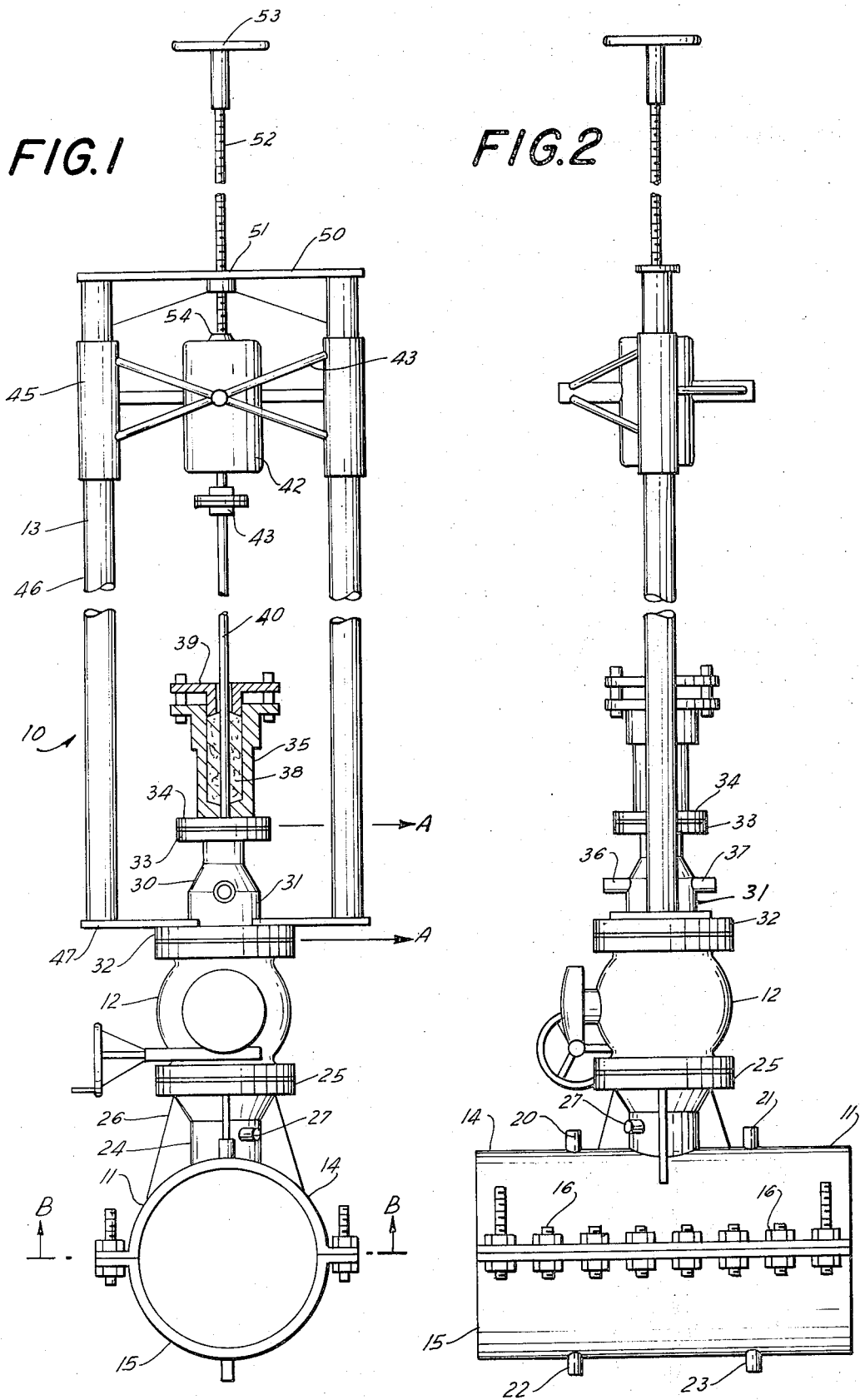

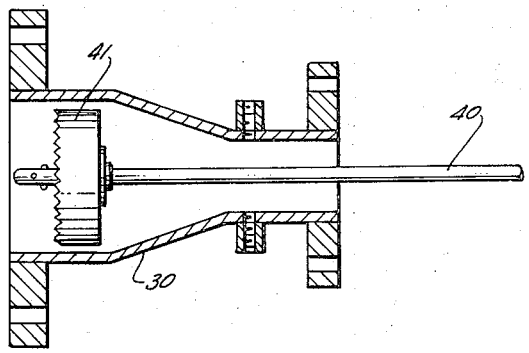
FIG. 4
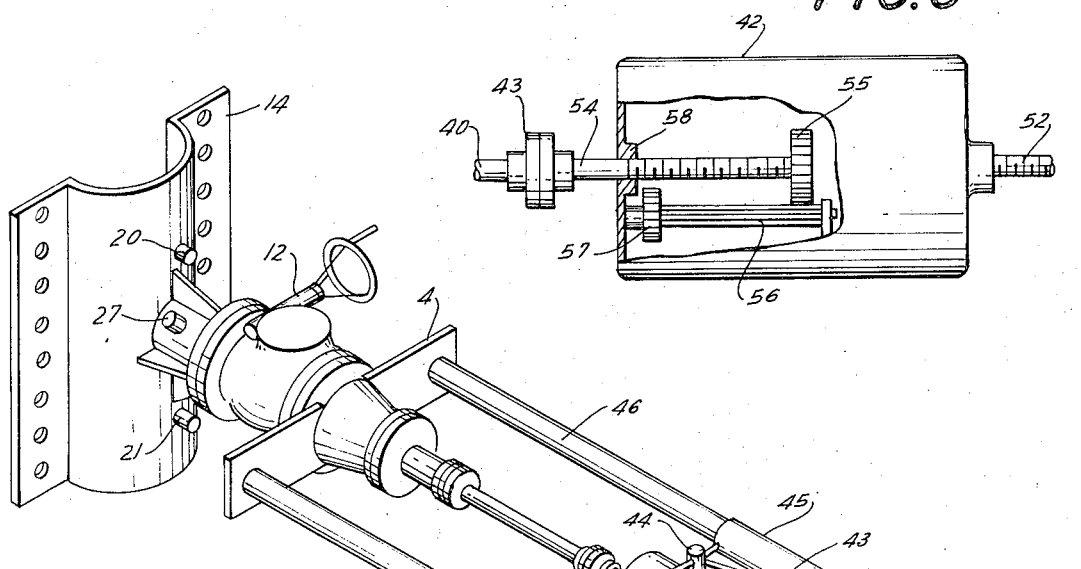
FIG. 5
FIG. 3
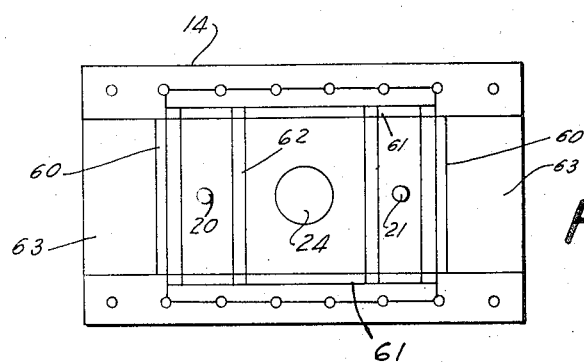
FIG. 6

SUB-SEA PIPELINE TAPPING DEVICE

BACKGROUND OF THE INVENTION

The present invention is related to those arts concerned with method and means for tapping a pipeline while in service.

In many types of operations involving conveying of fluids in piping conduits, it would be desirable if a connection could be made to the piping conduit while it is in service. This is especially true in the case of pipeline operations involving the use of submerged pipelines conveying crude oil and gas from off-shore drilling platforms to dry land storage facilities. It is a customary practice in the installation of such pipelines to install a tee and valve assembly at various presumed strategic points to allow for future connections. Otherwise, as is customarily done today in such off-shore operations, it becomes necessary to lift the pipeline off of the ocean floor top side onto a barge where the desired connection is then made, or where the pipeline cannot be lifted, e.g. because of its weight, to employ a caisson or dry habitat over the pipe and a dry tap made into the line. The use of a caisson is limited to shallow water applications, i.e., depths not exceeding 50 feet. For greater depths, a dry habitat is customarily employed which requires that the welders and pipe tapping mechanics be trained to dive and operate within the habitat. Needless to say, all of these approaches are considerably expensive. The installation of a tee and valve assembly is not only expensive from a material standpoint, but additionally, is subsequently quite often found not to have been installed in the most judicious location whereby extra piping must be run in order to intercept the pipeline to which it is to be connected at that point where the latter has been provided with a tee and valve outlet. It is extremely difficult, if not impossible, to accurately position from an economic viewpoint the location of such auxiliary connections such that the net result is it is quite often necessary to install many such future connections whereby the total installation cost of the pipeline is considerably increased without any assurance of their future use. Therefore, a method and means for tapping submerged pipelines while in service which does not involve an initial installation of additional equipment nor excessive disturbance of the pipeline on the ocean floor, as well as the costly installation of a caisson or dry habitat which require expensive surface support equipment and the training of personnel for its use, would be a welcomed contribution to the art.

SUMMARY

The present invention basically comprises pipe saddle means, valve means operably connected to the saddle means, and pipe tapping means which in turn is operably connected to the valve means. The pipe saddle means further comprises a split sleeve assembly having a first half member and a second half member which are adapted to mate together in a fluid tight relationship around a pipeline to be tapped. One of the sleeve members is provided with a side outlet adapted for connection to the valve means. The sleeve members are also provided with extended portions along their longitudinal sides which are adapted for being bolted together. Each sleeve member is also provided with a pair of spaced apart resilient seal members positioned essentially at each end thereof and which extend circumferentially over the inner peripheral surface of each sleeve member. In such fashion, when the sleeve members are mated together, the resilient seal members form in combination a pair of circumferential seals at each end of the saddle means which encompass a pipeline on which the seal has been installed. The sleeve members are also provided with resilient seal members extending longitudinally along their extended side portions such that when the sleeve members are bolted together on a pipeling, a fluid tight seal is thus defined between said sleeve assembly and the pipeline.

As a preferred embodiment, the pipe saddle means is provided with individual inlet and outlet ports in open communication with the space defined between the circumferential resilient seal means for injection of a sealing material within the chamber defined by the resilient seal members, the inner peripheral surface of the saddle means, and the outside surface of a pipeline on which the saddle means has been installed. Other preferred embodiments are directed to the provision of ports for pressure testing the entire assembly of the present invention before commencing a tapping operation, as well as thereafter, to insure a proper installation.

Another preferred embodiment is directed to certain structural features of the hydraulic drilling motor which prevents the operator from drilling through more than one side of the pipeline being tapped.

The present invention also provides a novel method for tapping a submerged pipeline while it is under pressure during operation.

BRIEF DESCRIPTION OF THE DRAWINGS

FIG. 1 in the drawings shows a side elevation view of the present sub-sea pipeline tapping device.

FIG. 2 in the drawings shows a front elevation view of the present device.

FIG. 3 in the drawings depicts an isometric view of the present device shown from the operator's end, showing only the top half of the pipe saddle.

FIG. 4 depicts a partial sectional view taken along the line A—A of FIG. 1 showing the position of the pipeline tapping cutter before commencing a tapping operation.

FIG. 5 in the drawings depicts an isolated partial phantom view showing certain structural details of the hydraulic drilling motor shown in FIGS. 1, 2, and 3.

FIG. 6 in the drawings depicts a plan view of the top half of the pipeline saddle forming a component of the present device and which would be the structure observed along the sectional line B—B of FIG. 1.

DESCRIPTION OF PREFERRED EMBODIMENT

Referring to FIG. 1 in the drawings, the present sub-sea pipeling tapping device assembly 10 comprises the pipe saddle portion 11 to which is operably affixed the straight flow through valve means 12 upon which the tapping superstructure 13 is operably affixed. The components cooperately function in the manner as set forth in detail hereinafter.

As shown in FIGS. 1 and 2, the tapping saddle 11 further comprises the upper portion 14 and the lower half 15, the former being shown in greater detail in FIG. 6 as described below. The members 14 and 15 are designed to mate together in a sealing relationship so as to form a fluid tight housing relative to a pipeline on which it is installed and which is to be tapped while under pressure during operation. The tapping saddle halves 14 and 15, as shown in FIG. 2, are rigidly connected to each other in their installation by virtue of the series of stud and nut assemblies 16. The number of stud and nut assemblies 16 is primarily a factor of the amount of pressure to which the saddle is subjected during operation and the size of the pipeline being tapped. The terminal studs 17 are preferably longer than the corresponding internal studs so as to serve as locating pins to thereby facilitate the initial alignment and positioning of the saddle assembly 11 during an installation operation. The upper half 14 of the tapping saddle is provided with the inlet ports 20 and 21 which are adapted to receive standard pipe plugs which are fitted therein after a tapping operation during which a sealing material is injected in the ports by valving and related conduit initially connected thereto and subsequently removed in the manner as described hereinafter.

The lower half 15 of the tapping saddle 11 is also provided with the two ports 22 and 23, respectively. These ports serve in a similar manner as the ports 20 and 21 of the upper half 14 of the saddle.

The tapping saddle 11 further comprises the extended neck portion 24 which in turn is welded to the upper portion 14 approximately in the center thereof and in open communication therewith. The standard welding flange 25 in turn is connected to the neck portion 24 and the combined structure reinforced and more rigidly affixed to the tapping saddle 11 by virtue of the gusset plates 26. This structural arrangement provides the strength necessary to withstand the moment imparted thereto at times by virtue of the leverage that can be exerted through the valve 12 and tapping superstructure 13 assembly. This additional strength is also required in the instance where the pipeline is snagged by an anchor in which case it is desired that the pipeline being connected to the main line be broken downstream of the valve 12 and clamp assembly 11 whereby flow will be shut off by virtue of the installation of a check valve in the vicinity of the valve 12. The port or connection 27 is provided in the neck portion 24 to allow circulation of a cooling and/or lubricating fluid where desired, as well as for initial pressure testing of the inner seals of the clamp pursuant to a tapping operation as described in detail below. Moreover, the port 27 can also serve as a source of fluid for operation of a fluid operated type valve which can be employed in lieu of the manually operated valve 12 as shown in the drawings.

The valve means 12 preferably comprises a straight through type of ball valve whereby full line size flow therethrough is realized for the reasons explained below. The valve 12 is rigidly bolted to the flange member 25 in the customary manner.

Connected to the valve 12 is the tapping superstructure 13 which further comprises the adaptor spool 30. In the embodiment shown in FIG. 1, the adaptor spool 30 further comprises the standard pipeline concentric welding reducer 31 to which is welded the flange members 32 and 33, respectively. The flange member 32 is adapted to mate with the corresponding flanged portion of the valve 12. As described below, the size of the adaptor portion 30 will vary, that is, the adaptor 30 will vary depending upon the size of the flange member 32 required for a tapping operation. However, the face-to-face dimension of the flange member 32 and 33 will remain constant for any given adaptor 30 design. In such manner, the superstructure 13 can be utilized over a wide range of pipeline sizes. For example, in the embodiment of FIG. 1, the valve 12 could comprise a 6" valve whereby the flange member 32 need be a standard 6" flange. The flange 33, on the other hand, might comprise a 4" flange as determined by the corresponding flange 34 of the stuffing box assembly 35. Of course, were the valve 12 a 4" valve, then the flange 32 would comprise a 4" flange and the connecting portion 31 of the adaptor 30 would in turn merely constitute a constant diameter member merely connecting the flange members 32 and 33, their face-to-face dimension being maintained constant. Conversely, were the valve 12 to be a 2" valve, the connecting member 31 would be a reducer swagging down from a 4" flange 33 to the 2" flange 32. Thus, it can be seen that the present tapping superstructure 13 can be employed over a considerable range of different sizes of tapping operations by judiciously changing the tapping adaptor 30 to mate with the valve 12 and saddle 11 assembly.

The adaptor 30 is also provided with the connections or ports 36 and 37 which provide for recirculation of a cooling and/or lubricating material in conjunction with the port 27 as described hereinafter.

The tapping superstructure 13 further comprises the stuffing or sealing box assembly 35 which further comprises the packing material 38 and stuffing gland 39 which prevents leakage along the drill shaft 40 during a pretap pressure test or after tapping a pipeline. Upon jamming the packing gland 39 against the packing 38 in any suitable manner, e.g. by a bolting arrangement (not shown) between the packing gland 39 and the flanged portion of the stuffing box 34, the packing 38 is forced or expanded against the outer peripheral surface of the drill shaft 40 to thereby seal off the annulus defined between the shaft 40 and the packing 38.

The drilling shaft 40 is constructed of a diameter sufficient to prevent its drift or lateral movement during a drilling operation. The drilling shaft 40 is also adapted to receive the cutting tool 41 as shown in FIG. 4. The tool 41 is provided with a pilot or centering drill portion to insure a straight cut. The pilot is provided with spring loaded balls along its length which serve to retrieve the coupon cut out of the pipe being tapped since it is not desirable to allow the coupon to fall into the main pipeline. The shaft 40 is rotated by virtue of the hydraulic motor 42, or some other suitable rotary means. The coupling assembly 43 is provided as a weak link to prevent breaking off of the shaft 40 or the drilling tool 41 during a drilling operation. If a portion of a shaft 40 within the adaptor 30 were to break off after penetration has been made of the pipeline under pressure, such shaft portion could not be readily retrieved and which might also interfere with closing of the valve.

The rotary motor 42 is supported upon the valve 12 and saddle 11 assembly by virtue of the sliding motor cage assembly comprising the support rods 43 which are rigidly connected to the motor extensions 44 and the slide sleeves 45. The sleeve members 45 in turn are adapted to mate in a sliding relationship with the motor guide members 46. The guide members or rods 46 are rigidly connected to the support plate members 47 which in turn are rigidly affixed to the valve substructure, generally by being bolted to the flange member 32 of the adaptor 30 in the process of connecting the superstructure 13 to the valve assembly 12.

The other ends of the guide rods 46 are rigidly affixed to the connecting member 50 which also serves to support the rotary motor 42 as well as provide means for positioning the motor 43 preparatory to a tapping operation.

The support member 50 is provided with the threaded sleeve member 51 which is adapted to receive the threaded shaft 52 which in turn is provided with the handle 53 at one end and its other end being rotatably mounted within the slip connection 54 connected to or forming a part of the rear housing portion of the motor 42. The shaft 52 is thus rotatably fixed to the motor 42 and serves to position the motor 42 along the longitudinal axis of the present device upon screwing the shaft 52 inwards or outwards of the threaded coupling member 51 in the manner of employing the present device as described below. This design provides considerable savings in diver bottom time in that it allows the rapid positioning of the tool before drilling and thereafter allows for rapid retrieval of the drill and coupon after a tapping operation.

FIG. 5 depicts a preferred design of the drilling motor 42 which thereby minimizes operator error in a number of respects during the use of the present device. One problem to be avoided is the complete drilling through of both walls of the pipeline being tapped. That is, if the operator does not take certain precautions, especially if a small diameter pipeline is being tapped, it is possible that he will drill completely through the top side of the pipeline and penetrate the bottom side. Therefore, it can be appreciated that a manner and means to prevent this is highly desirable and it is the objective of the embodiment of FIG. 5 to thereby prevent such error. As brought out previously, the drilling motor 42 can be any conventional rotary type of tool, however, a standard type of hydraulic motor, e.g. a sliding vane design of hydraulic motor, driven by air or a liquid is preferred.

Gear 57 which is fixed to shaft 56, is rotated by the rotor (not shown) of the motor 42 which in turn rotates gear 55 that is fixed to the shaft 54. The rotation of shaft 54 causes the low advancement of the shaft 40 and cutting tool 41 by virtue of the threaded gear 58 rigidly fixed to the housing of the motor 42.

Referring to FIG. 6 in the drawings, a double row of the peripheral packing 60 is provided together with the longitudinal or lengthwise packing 61. FIG. 6 depicts the top half or fluid outlet portion 14 of the pipe saddle 11. The bottom half 15 of the present pipe saddle 11 is likewise provided with similar sealing members 60 and 61 to thereby provide an entire fluid tight compartment around the peripheral surface of the pipeline to be tapped and into which compartment, an epoxy sealing material is injected pursuant to a preferred embodiment of the present invention.

Each half of the pipe saddle 11 is provided with the extended portion 63 which extends outwards from the sealing members 60. The portions 63 are adapted, that is, machined, to mate with the outer peripheral surface of the pipeline being tapped such that metal to metal contact is realized to provide skin friction which gives the entire assembly sufficient structural strength to prevent any damage to the main pipeline by uniformly dispersing the load over a sufficient area whenever the assembly is subjected to some stress. Additionally, this skin friction also prevents the rotation of the clamp and valve assembly allowing a tap to be made at any angle or position of the present device or that of the pipeline being tapped.

By way of operation, a diver first prepares a submerged pipeline to be tapped pursuant to the present method and means by first removing any concrete and/or any corrosion proofing material which has been applied over the outside peripheral surface of the pipeline, sufficient material being removed over a length slightly greater than that of the pipe saddle means 11. Such materials are generally removed by scraping or sanding, however, they can be removed by underwater sandblasting or air or hydraulic power buffing. The external surface of the pipe itself is then rendered essentially smooth, that is, any large protuberances, e.g. in the form of wells, or the like, are then leveled or removed by air or hydraulic grinding, as well as by hand or power filing. Following this, the piping saddle 11 is then installed by first placing the lower half 15 into position over the outside surface of the pipe followed by positioning of the tap portion 14 of the saddle into position over the outside of the pipe in a mating relationship with the lower portion 15. The location pins 17 are provided to facilitate mating of these members during their installation. Where size or water depth dictate, an automatic line-up assembly can be used for making up the clamp.

After positioning the saddle halves 14 and 15 into juxtaposition and in alignment with each other, the bolt and stud assembly 16 are made up evenly until such time that the saddle 11 is installed in place.

After the installation of the saddle 11, the valve 12 is bolted to the flange member 25. Then the tapping or drilling assembly 13 is mated and bolted to the valve 12. Of course, if sea and operating conditions are favorable, the whole assembly as shown in FIGS. 1 and 2 can be installed in toto.

The entire assembly is then pressure tested by introducing pressure at port 27 which allows testing of seals 62 and flange connections 25 and 32, and the packing 38 to determine if they are pressure tight. Thereafter, the ports 22 and 23 are plugged and pressure introduced through ports 20 and 21 to determined if seals 60 are pressure tight.

After completion of pressure testing, the diver then rotates handle 53 inwards or clockwise until tool 41 contacts the surface of the pipeline to be tapped. Then the hydraulic motor 42 is turned on and the tapping is performed automatically as explained above eliminating any human error in the operation. When tool 41 has penetrated the pipeline, motor 42 automatically shuts itself off thus preventing over travel of the drill stem 40. Then the diver rotates the handle 53 counterclockwise to rapidly retrieve the cutting tool 41 and the coupon to a position outside of the valve 12. The valve 12 is then closed by the diver.

If coolants or lubricants are required during the tapping operation described above, they can be introduced through ports 36 or 37 and exit through port 27, or vice versa.

After valve 12 is closed, the pressure in the adaptor 30 and packing assembly 35 will be relieved through ports 36 or 37 thus allowing the diver to remove the assembly 13 from atop valve 12. Ports 20 and 21 are then reopened to determine if seals 62 are still pressure tight and a visual check is made at the ends of the clamp 11 to determine if seals 60 are still pressure tight.

Once the system passes this final leak test, then the plugs 20 and 21 are removed and a source of a hardening epoxy resin, or some other similar sealing material, is pressure injected through ports 22 and 23 respectively into the annulus defined between the sealing members 60 and 62, the inner peripheral surface of the saddle 11 and the outer peripheral surface of the pipe which lie within the interior of such sealing members. Preferably, in the process of pressurizing this annulus or chamber, a valve is initially installed at either of the connections 22 or 23 for easy connection of the source of epoxy resin. In any event, the epoxy resin is pumped into the before defined chambers until such time a quantity of epoxy resin exits from ports 20 and 21 which replaces all air and water trapped in these chambers thereby permanently protecting seals 60 and 62 from deterioration. After filling the chambers with the epoxy resin, ports 20, 21, 22 and 23 are then plugged with stainless steel pressure rated pipe plugs. The system is then preferably allowed to set until such time that the epoxy resin hardens which is primarily a function of the type of resin employed as well as the amount of catalyst utilized for its curing or cross-linking.

The stainless steel pressure rated valve installed in port 27 for the initial pressure testing is plugged with a stainless steel pressure rated pipe plug and remains in the system for future use in conjunction with a fluid operated valve as inventioned above.

The diver can then either blind flange the valve 12 or install any pipeline connections the customer may require.

After conclusion of an operation, the areas of the tapped pipeline that were exposed for installation of the saddle 11, as mentioned above, are then coated with splash zone or other similar type corrosion proofing materials.

In those installations where the present device has been utilized to install piping connections that extend above the ocean floor, a net guard is installed over the whole system to prevent fouling of commercial fishermen's nets.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A method of tapping a submerged pipeline while it is in operation comprising:
   a. preparing the external surface of the pipeline for receiving a pipe saddle;
   b. installing thereover a side outlet pipe saddle having a double row of internal circumferential seals with inlet and outlet ports therebetween;
   c. connecting a full flow through valve to the side outlet of the pipe saddle;
   d. connecting a pipe tapping assembly to the valve means;
   e. testing the assembly for leaks;
   f. tapping the pipeline; and
   g. injecting a sealing material into the pipe saddle means into the chamber defined between the double row of seals, the pipe saddle, and the pipeline.

2. The method of claim 1 further characterized in that:
   a hardening epoxy material is injected into the pipe saddle means to seal off the chamber defined between the double row of seals, pipe saddle, and pipeline.

* * * * *